Jan. 19, 1965     R. C. CAYLOR ETAL     3,166,197
REMOVABLE ATTACHMENT FOR VEHICLES
Filed May 27, 1963     3 Sheets-Sheet 1
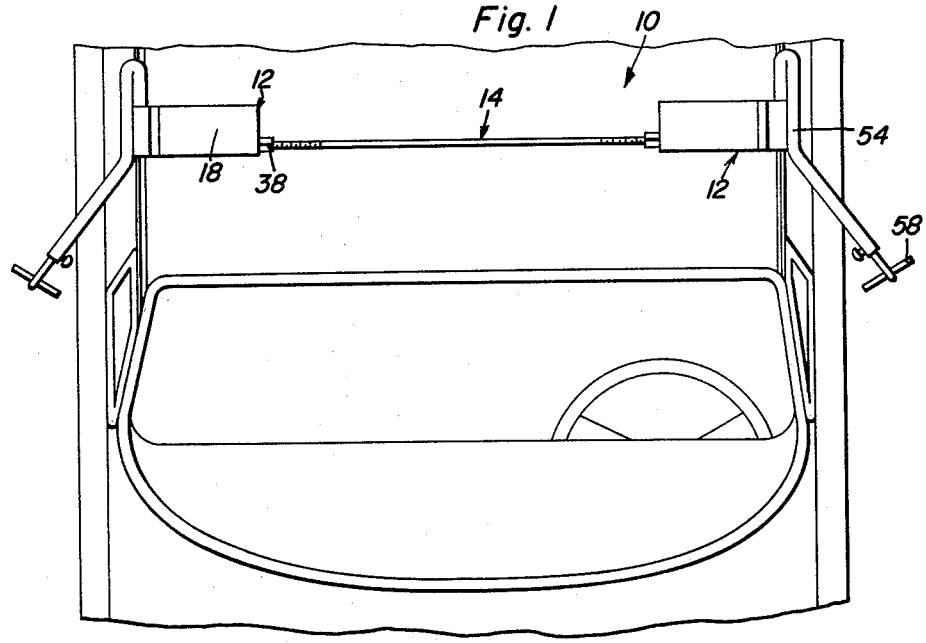
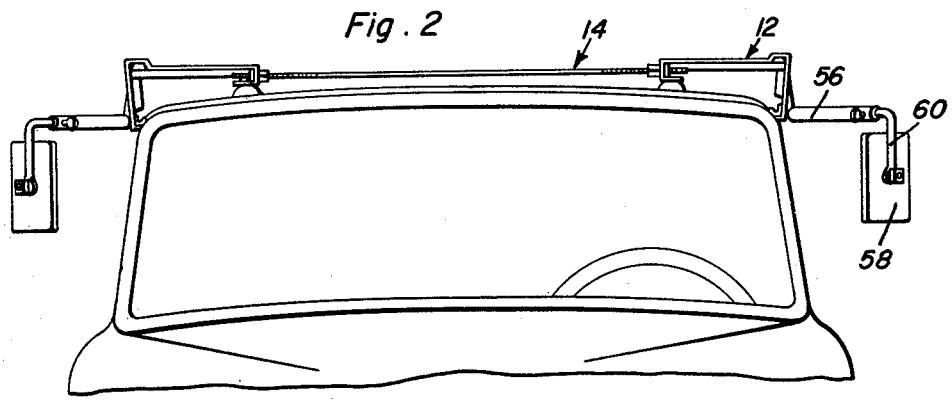
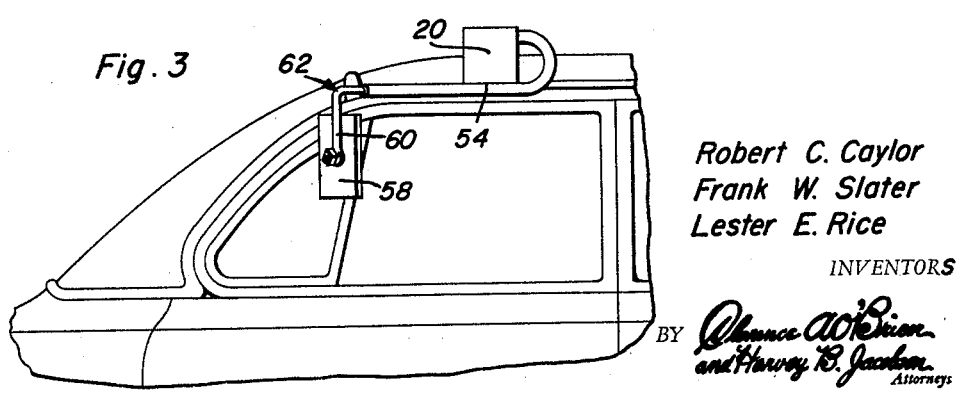
Robert C. Caylor
Frank W. Slater
Lester E. Rice
INVENTORS
BY
Attorneys

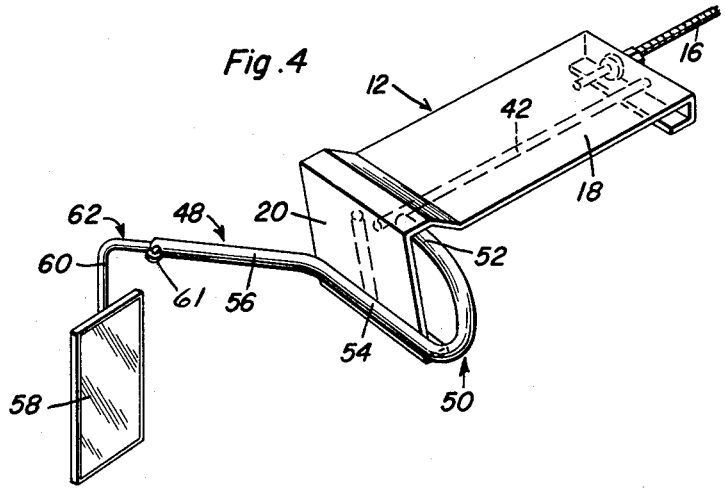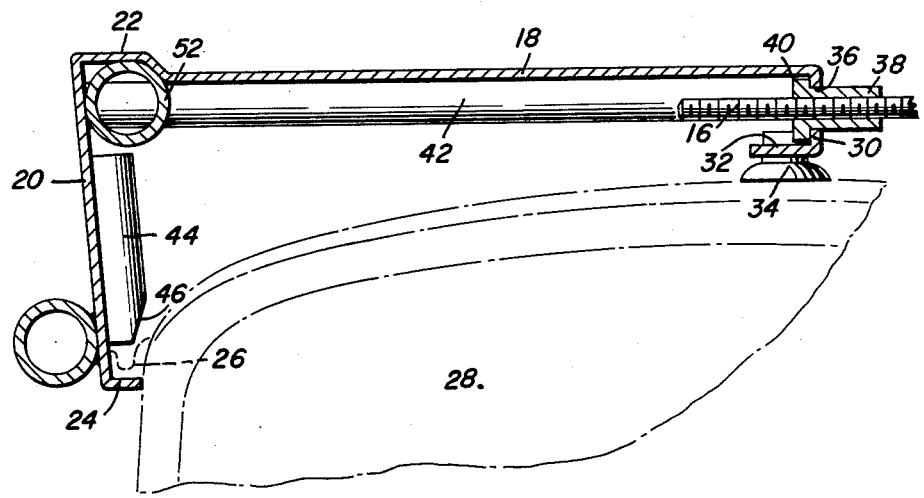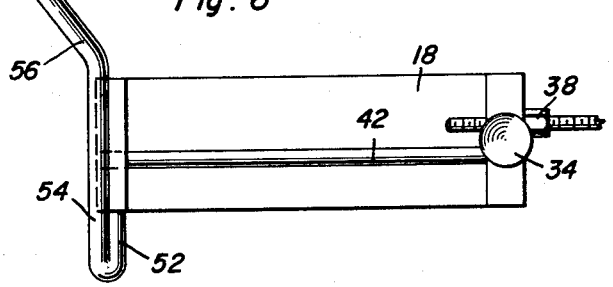

Jan. 19, 1965 R. C. CAYLOR ETAL 3,166,197
REMOVABLE ATTACHMENT FOR VEHICLES
Filed May 27, 1963 3 Sheets-Sheet 3
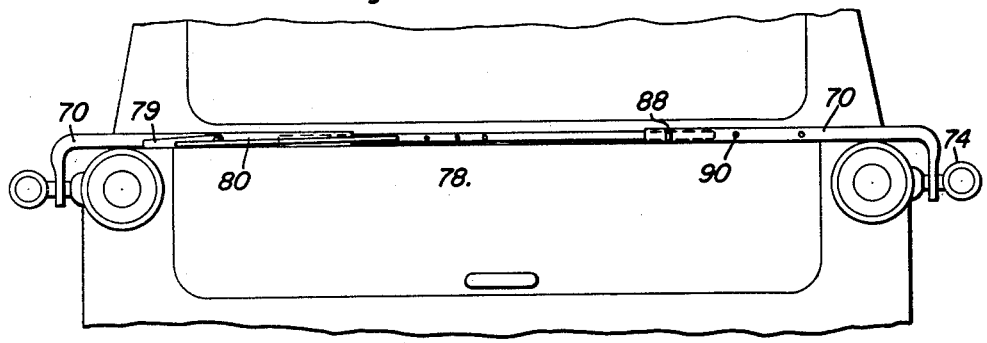
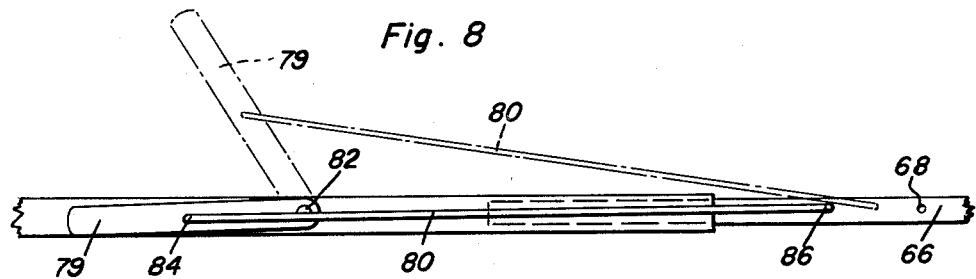
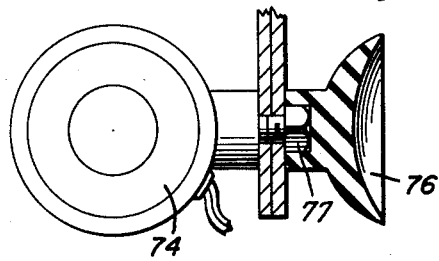
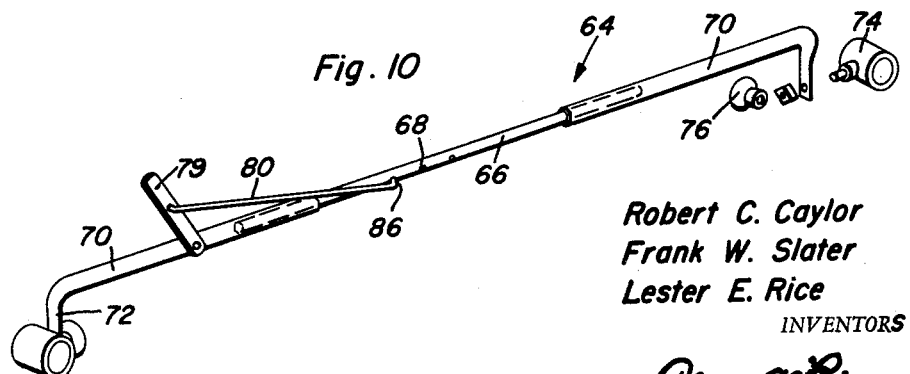
Robert C. Caylor
Frank W. Slater
Lester E. Rice
INVENTORS

United States Patent Office 3,166,197
Patented Jan. 19, 1965

3,166,197
REMOVABLE ATTACHMENT FOR VEHICLES
Robert C. Caylor, 7057 E. Redbud Road; Frank W. Slater, 3840 N. Vine Ave.; and Lester E. Rice, 6365 E. Calle Castor, all of Tucson, Ariz.
Filed May 27, 1963, Ser. No. 283,472
2 Claims. (Cl. 211—86)

The present invention is generally concerned with external vehicle accessories, and is more particularly related to a removable attachment means for such accessories which can be temporarily releasably mounted on various vehicles as might be demanded under special circumstances such as the temporary mounting of signal lights or reflectors on a towed vehicle.

As will be readily appreciated, occasions frequently arise where it becomes necessary to temporarily provide for various external auto accessories, such as for example signal lights and stop lights, on a vehicle which is being towed, whether this vehicle be a disabled automobile or a boat. Similarly, it often becomes desirable or necessary to increase the visibility of a driver of a vehicle by the provision of one or more side view mirrors so as to, for example, enable a clear view around a towed trailer. Accordingly, it is a primary object of the instant invention to provide an attachment whereby any number of different types of external automobile accessories can be quickly and easily mounted on a vehicle in a manner which requires only a minimum amount of effort and no modification whatsoever of the vehicle itself, the attachment being clamped between the opposite sides of the vehicle in various ways.

It will of course be recognized that while the attachment of the instant invention is referred to as being temporary or removable, the attachment, especially when utilized to provide side rear view mirrors, can, if deemed desirable, be left permanently secured to the vehicle, this mounting of the mirrors requiring no drilling of holes.

It is also considered particularly significant that the attachment of the instant invention is capable of being rapidly and simply mounted upon a wide range of vehicles.

Likewise, it is an object of the instant invention to provide an attachment which is relatively simple in construction, capable of economical manufacture, and, upon being installed, of an extremely rigid nature, there being no danger of the attachment being dislodged during movement of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a vehicle having the removable attachment of the instant invention, in this case mounting side view mirrors, secured thereto;

FIGURE 2 is a partial front elevational view of the vehicle with the attachment thereon;

FIGURE 3 is a partial side elevational view of the vehicle with attachment;

FIGURE 4 is an enlarged perspective view of one end of the attachment;

FIGURE 5 is an enlarged longitudinal cross-sectional view of that portion of the attachment illustrated in FIGURE 4 showing the manner in which the attachment is secured to a vehicle;

FIGURE 6 is a partial bottom plan view of the portion of the attachment illustrated in FIGURE 4;

FIGURE 7 is an illustration of a modified form of attachment, in this instance used to mount signal lights, secured to the rear trunk deck of a vehicle such as might be desirable were it necessary to tow the vehicle;

FIGURE 8 is an enlarged partial elevational view of the attachment of FIGURE 7 illustrating the manner in which the clamping of the attachment is to be effected;

FIGURE 9 is an enlarged partial cross-sectional view of that portion of the attachment which engages the side of the vehicle; and FIGURE 10 is a partially exploded perspective view of the modified attachment.

Referring now more particularly to the drawings, reference numeral 10 is used to generally designate the form of attachment illustrated in FIGURES 1-6, this attachment 10, while not specifically limited thereto, being particularly adapted for the mounting of either one or two side view mirrors on a motor vehicle such as an automobile or truck.

The attachment 10 consists basically of two end members or brackets 12 adjustably interconnected by means of an elongated rod 14 having, at least on the end portions 16, external threads.

Each of the brackets 12 consists of a rigid flat plate bent so as to form a first horizontal leg 18 and a second leg 20 depending downwardly at an angle, relative to the first leg 18, slightly less than 90 degrees, the horizontal leg 18 having that portion 22 adjacent the point of jointure to the leg 20 upwardly deformed so as to form an angular offset portion. The vertical leg 20 of each bracket 12 terminates, at its free end, in an inwardly extending flange portion 24 engageable, upon a mounting of the attachment 10, beneath the rain gutter 26 conventionally provided on various vehicles 28 such as automobiles and trucks. The free end of the horizontal leg 18 of each of the brackets 12 terminates in a vertically extending portion 30 which in turn terminates in an inwardly directed base flange 32, this base flange 32 having a rubber, or other suitable material, protector or cushion 34 which is engaged with the upper surface of the vehicle 28 upon a mounting of the attachment 10. The depending or vertical portion 30 is provided with a transverse aperture 36 therethrough, this aperture 36 rotatably receiving an adjusting nut 38 which in turn threadedly receives the threaded end portion 16 of the elongated rod 14, a turning of the nut 38 effecting the movement of the brackets 12 toward each other so as to effect the desired clamping of the attachment 10 on a vehicle. It will be noted that the adjusting nut 38 is provided with an enlarged head 40 on the inner end thereof so as to retain the nut 38 within the aperture 36 while the brackets 12 are being drawn toward each other and the rod 14 tensioned so as to tightly clamp the attachment 10 to the vehicle with the inwardly directed flanges 24 engaged beneath the adjoining rain gutters 26. It will be noted from the drawings that, in order to rigidify each of the brackets 12, an elongated rigid bar 42 is welded longitudinally along the inner surface of the leg 18, the ends of the bar 42 being respectively welded to the depending portion 30 and the vertical leg 20. Additionally, a second reinforcing bar 44 is provided in each bracket 12, this bar 44 being welded longitudinally along the vertical leg 20 and stopping short of the inwardly directed flange 24 a distance sufficient so as to accommodate the rain gutter 26, this bar 44 having the lower portion thereof suitably beveled, as at 46, so as to not interfere with the rain gutter or adjoining vehicle roof.

This particular attachment has been illustrated and will be described as mounting a pair of side view mirrors, however, it should be appreciated that various other vehicle accessories can be substituted for the side view mirrors within the scope of the instant invention, such as for example turn signals, clearance lights, stop lights, rear lights, reflectors, etc. The mirror assembly 48, such an assembly being mounted on either one or both of the brackets 12, consists of a first hollow tubular generally U-shaped member 50 having a first leg 52 thereof received within the angular offset portion 22 and abutted against the reinforcing bar 42, this leg 52 being welded to both the adjoining bracket legs 18 and 20 and the bar 42. The other leg 54 of the tubular member 50 extends along and is welded to the lower external surface of the vertical leg 20, this leg 54 being substantially longer than the leg 52 and having the free end 56 thereof outwardly angled. The mirror 58 is affixed to the depending end portion 60 of an elongated rod 62, the other end of which is telescopically received within the free end of the leg 54, suitable means, such as a setscrew 61, being utilized so as to fix the rod 62 in any one of a plurality of adjusted positions.

With reference to FIGURES 7–10, it will be noted that a modified form of attachment 64 has been illustrated therein, this attachment 64 being possibly more versatile than the attachment 10 in that it does not require engagement with the rain gutters of a vehicle thus enabling it to be readily attached to, for example a boat or the rear trunk deck of an automobile as illustrated in FIGURE 7.

This attachment 64 consists of an elongated rod 66 having a plurality of longitudinally spaced holes 68 therein, the opposite ends of the rod 66 being telescopically received within tubular bracket members 70. The tubular bracket members 70 each has the outer end 72 thereof downwardly bent and flattened, this flattened end 72 having an accessory, illustrated in the drawings as being a light 74, mounted on the exterior thereof, and a cushioning means, such as for example a rubber suction cup 76 mounted by a screw 77 on the interior thereof, the suction cups 76 being brought into tight non-slip clamping engagement with the opposite sides of the vehicle 78.

The longitudinal adjustment of the tubular brackets 70 towards each other along the elongated rod 66 is effected by means of an elongated handle 79 and link 80, the handle 79 having one end thereof pivotally secured to one of the brackets 70 at approximately mid-height at a point spaced inwardly from the rod receiving end thereof, this point of pivotal connection being denoted by reference numeral 82. The rigid link 80 has one end 84 thereof pivotally secured to the handle 79 at an intermediate point therealong, the second end 86 of the link 80 being laterally bent and selectively positionable within any one of the holes 68 whereby a downward pivoting of the handle 79 from a first open position, illustrated in phantom lines in FIGURE 8, to a second closed position, illustrated in full lines in FIGURE 8, effects a drawing of the rod 66 into the bracket 70 to which the handle 79 is pivoted. With attention still being directed to FIGURE 8, it will be noted that, in moving the handle 79 from its open position to its closed position, the point of pivotal engagement between the link end 84 and the handle 79 moves past the imaginary line or plane extending through the point of pivotal connection indicated by reference numeral 82 and the point at which the link end 86 is rotatably engaged within one of the holes 68 thus tending to lock the handle against any accidental release. As will be appreciated from FIGURE 7, the closing movement of the handle 79 is limited by engagement with the vehicle 78 itself.

The opposite end of the rod 66 can either be fixedly secured within the other tubular bracket 70 or, if additional adjustability is deemed desirable, adjustably secured therein by means of a suitable locking pin 88 engaged through a hole in the rod 66 and any one of a plurality of longitudinally spaced holes 90 in the bracket 70.

From the foregoing, it should now be recognized that a novel inventive concept has been defined relating to the provision of means for quickly and easily either temporarily or permanently mounting exterior vehicle accessories upon a vehicle, this being achieved by clampingly engaging the opposite vertical sides of the vehicle at any suitable point there along as the specific situation might demand. Further, while two forms of the attachment have been specifically illustrated, it should be recognized that, within the scope of the instant invention, various additional modifications are possible, such as for example the use of a tension spring to clampingly draw the opposite brackets toward each other.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A removable attachment for vehicles consisting of an elongated member, laterally projecting vehicle engaging means secured to each end of said elongated member, means for drawing the vehicle engaging means inwardly toward each other for varying the effective length of the elongated member and clamping the vehicle therebetween, and an external vehicle accessory means mounted on at least one of the vehicle engaging means, said elongated member including a central rod, and said laterally projecting vehicle engaging means consisting of substantially right angular brackets, said brackets having a first leg aligned with the central rod and slidably engaged with the opposite ends thereof, the second leg of each bracket terminating in an inwardly directed flange engageable beneath a vehicle rain gutter, said accessory means including an elongated hollow tube secured to the second leg of the corresponding bracket and projecting, at an angle, laterally outwardly therefrom, an elongated rod adjustably telescoped within the outer end of the hollow tube, and an accessory secured to the outer end of said rod.

2. A removable attachment for vehicles consisting of an elongated bar positionable transversely across an upper portion of a vehicle, a pair of end members aligned with and adjustably receiving the ends of the elongated bar, the outer ends of said end members being downwardly angled so as to substantially parallel the vehicle sides, means for pulling at least one of the end members inwardly relative to said elongated bar so as to bring said end members into clamping engagement with the vehicle sides, and an external vehicle accessory mounted on at least one of said end members, each of said end members having a downwardly angled inner portion, each inner portion having a transverse aperture therethrough, an internally threaded nut rotatably mounted within said aperture, the ends of said elongated bar being externally threaded and threadedly received within the nuts, said nuts and complementary bar ends constituting the means for effecting the pulling of the end member.

References Cited by the Examiner
UNITED STATES PATENTS

| | | | |
|---|---|---|---|
| 2,222,636 | 11/40 | Strauss | 224—42.1 |
| 2,584,292 | 2/52 | Rogers | 224—42.1 |
| 2,599,306 | 6/52 | Whitehead | 248—276 |
| 2,728,502 | 12/55 | Plantico | 224—42.1 |
| 2,743,353 | 4/56 | Nicholson | 240—52.2 X |
| 2,783,367 | 2/57 | Locke | 224—42.1 X |
| 2,812,917 | 11/57 | Crosby | 248—226 X |
| 2,833,502 | 5/58 | Wildeboor | 248—226 |
| 2,853,119 | 9/58 | Balfour | 224—42.1 |
| 3,057,994 | 10/62 | Irmischer | 248—276 X |
| 3,081,057 | 3/63 | Farnsworth | 248—226 |

FOREIGN PATENTS 814,298    8/54    Great Britain.

CLAUDE A. LE ROY, *Primary Examiner.*